June 7, 1966 J. S. BOYLE 3,254,764
GREEN LUMBER SORTER

Filed June 18, 1963 2 Sheets-Sheet 1

Fig. 1.

INVENTOR.
JOHN S. BOYLE
BY
ATTORNEYS

June 7, 1966  J. S. BOYLE  3,254,764
GREEN LUMBER SORTER
Filed June 18, 1963  2 Sheets-Sheet 2
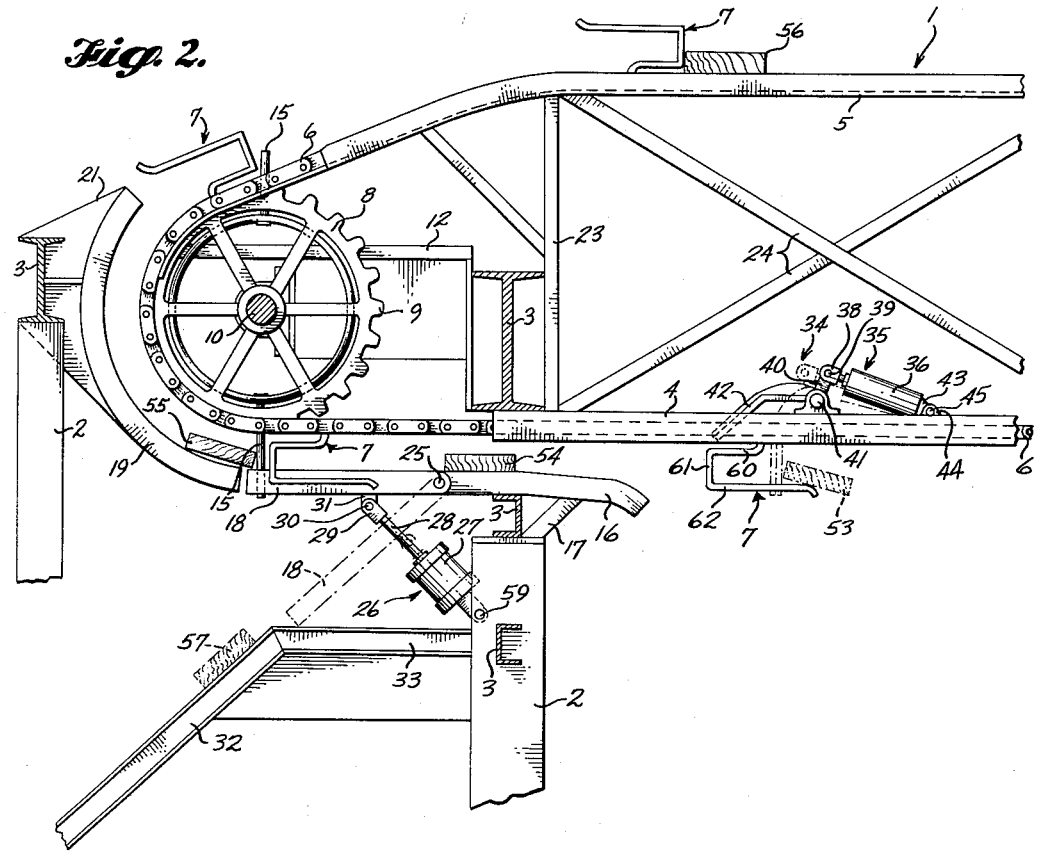
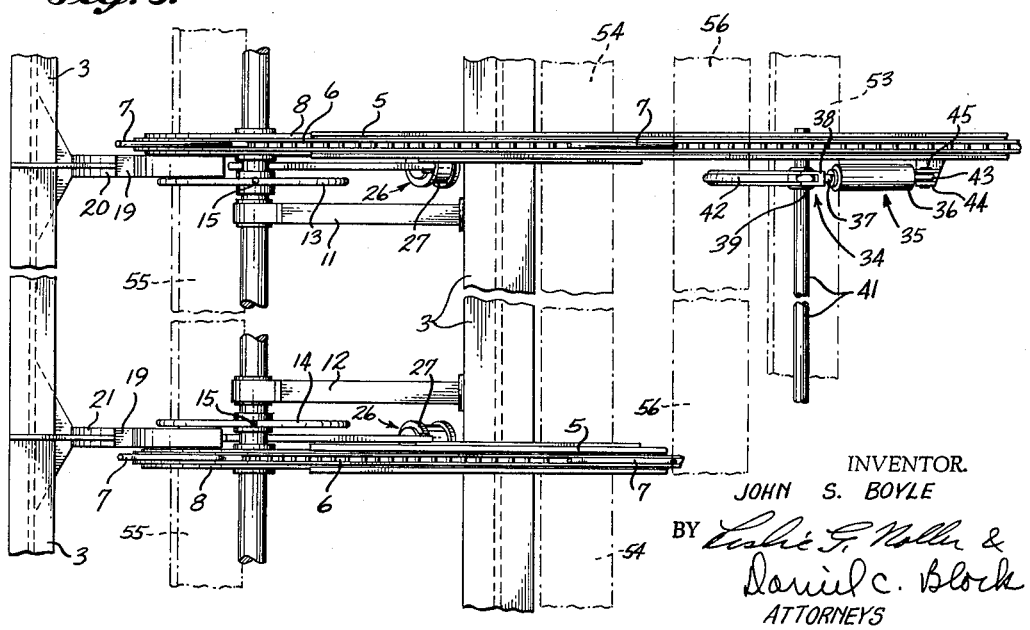
INVENTOR.
JOHN S. BOYLE
ATTORNEYS

United States Patent Office 3,254,764
Patented June 7, 1966

3,254,764
GREEN LUMBER SORTER
John S. Boyle, Tacoma, Wash., assignor to Weyerhaeuser Company, Tacoma, Wash., a corporation of Washington
Filed June 18, 1963, Ser. No. 288,736
3 Claims. (Cl. 209—73)

This invention relates to an apparatus for conveying and ejecting graded green lumber into bins having similar graded lumber and more specifically, to a return apparatus associated with the conveyor to return the lumber to the grading station in the event that the graded lumber is not ejected into a receiving bin.

It is the practice in the lumber industry to saw logs into various dimensions and convey the formed lumber to a grading station where several gradermen mark the lumber for quality. The graded lumber is then sorted and piled in stacks by numerous workmen standing along the conveyor. Each stack of lumber will be of a definite specification which can be a particular grade, width, length, thickness, or a combination thereof.

This method of sorting, stacking, and grading lumber is inefficient.

As the technology in the lumber industry has advanced, the speed at which lumber can be produced has increased. However, the speed at which the lumber is hand sorted and stacked has not increased, which results in a slowdown of production and an overall increase in costs.

Moreover, the number of grades of lumber has increased, which results in an increased number of stacks required to be formed by the workmen. This is time consuming and costly.

One proposed solution to these problems was to place the sorted lumber on a conveyor and eject the lumber in respective bins. When one of the bins was filled, the lumber therein would be dumped and carried to other apparatus for further processing. This type of proposed solution is set forth in Rambo, U.S. Patents Nos. 2,902,150 and 2,998,133.

This solution is unsatisfactory because there is provided nothing in the system to return the lumber in the event that the bin for receiving the lumber is being dumped. Accordingly, catch arms must be used or the lumber must be deposited in another bin, which results in a downgrading of the lumber.

The object of this invention is to provide a lumber conveyor with a return system to reclaim any lumber that is not ejected into the proper receiving bin.

Another object of this invention is to provide a lumber conveyor having a plurality of receiving bins and a return system to convey the lumber back to the grading station in the event that the lumber is not ejected into the proper bin.

These and other objects and advantages will become manifestly clear to those skilled in the art when taken in conjunction with the detailed description and drawings, wherein:

FIGURE 1 is a side elevational view of the conveyor system and return apparatus of the present invention.

FIGURE 2 is an enlarged side elevational view of the return apparatus of the conveyor system.

FIGURE 3 is a top plan view of the end return system of FIGURE 2.

Referring to the drawings in general, the lumber conveyor is generally indicated at 1. The lumber conveyor 1 is provided with a plurality of vertical posts 2 and a plurality of horizontal support posts 3 to present a generally rectangular or elongated frame structure.

Extending from one end of the frame to the other is a pair of spaced apart lower track members 4 and a pair of upper spaced apart track members 5. The track members 4 and 5 are adapted to receive chains 6 which extend the full length of the conveyor 1. Secured to the chains at predetermined intervals are carrier bars 7 which are adapted to receive pieces of graded or sorted lumber to be conveyed to a plurality of bins A, B, C, D, E, or F.

The chains 6 extend around sprockets 8 at the end thereof which sprockets 8 are provided with teeth 9 that mesh with chains 6. The sprockets 8 are mounted on a shaft 10 in a spaced apart relationship so that the chains 6 may extend therearound to carry the carrier bars 7.

The shaft 10 is supported by a pair of support arms 11 and 12 connected to one of the horizontal posts 3.

Mounted on the shaft 10 are a pair of spaced apart wheels 13 and 14 having push arms 15 mounted thereon. The push arms 15 are elongated bars adapted to push a piece of lumber, indicated at 55 in FIGURE 2, around the periphery of the spaced apart sprockets 8 and up onto track 5.

Spaced below the chains 6 is a receiving arm 16 which is adapted to receive lumber, indicated at 54, that will be pushed around the sprockets 8 and reclaimed. The arm member 16 as supported by a support member 17 mounted on one of the vertical posts 2.

Pivotally connected to the receiving arm 16 is a movable arm 18 adapted to pivot around pivot pin 25 to eject waste lumber indicated at 57 which will slide down the movable arm 18 when the arm 18 is lowered to slide down the chute 32 mounted on the vertical frame support 2 by a support arm 33.

A pair of arcuate slide members 19 are mounted at the end of the movable arm 18 by support means 20 and 21.

In this manner any lumber that is to be reclaimed, such as that indicated at 55, will be pushed around the arcuate portion 19 and onto the upper portion of the chains 6 mounted in the upper track 5.

The upper and lower tracks 5 and 4 are maintained in their spaced apart position by a chain support 22 having vertical braces 23 and diagonal brackets 24. In this manner the lumber may be carried by the bars 7 to the respective bins and also may be reclaimed on the upper portion thereof as indicated at 56 in FIGURE 2.

The movable arm 18 is activated by hydraulic motor 26 having a cylinder 27 and a piston, not shown, therein with a piston rod 28 extending through one end of the cylinder 27. The outer end of the piston rod 28 is provided with a yoke 29 which is mounted on a rib 31 by pivot pin 30. In this manner the hydraulic motor may be actuated to lower or raise the movable arm 18 around pivot pin 25. The opposite end of said hydraulic motor 26 is pivotally mounted on the frame member 2 as indicated at 59 in FIGURE 2.

As shown more clearly in FIGURE 1, the conveyor 1 is provided with a rake mechanism 34 to eject lumber 53 into the respective bins. As is clearly shown in FIGURE 1, each of the bins is provided with two rake mechanisms 34. One rake mechanism is provided in the front portion of the bin while the second one is provided in the back portion of the bin. In this manner, any lumber that is designated for a particular bin, such as bin B, will be ejected therein by the front rake mechanism 34. The next piece of lumber 53 that is adapted to be received in bin B will be ejected into the bin B by the back rake mechanism 34. In this manner, the bin B will be evenly filled up. That is, the lumber 53 will be evenly distributed in the bin B without piling up on one side thereof.

Each of the rake mechanisms 34 is provided with a hydraulic motor 35 having a cylinder 36 and a piston, not shown, mounted therein. Connected to the piston and extending through one end of the cylinder 36 is a piston rod 37 having a yoke 38 mounted thereon. The yoke 38 is pivotally connected to a rib 40 mounted on shaft 41 so that upon actuation of the hydraulic motor 35 the piston rod 37 will extend from the cylinder 36 and rotate the shaft 41. Mounted on the shaft 41 are spaced apart rake arms 42 which are adapted to be lowered down into the path of the lumber 53 to eject it into the respective bins. The opposite end of the hydraulic motor 35 is provided with an eye 43 that extends into a yoke 44 mounted on the frame structure by a pivot pin 45. Accordingly, when the hydraulic motor 35 is actuated, the rake arms 43 will be lowered down into the path of the lumber 53 as shown in the phantom lines in FIGURE 2.

The receiving bins A, B, C, D, E, and F are in the form of carts 48 mounted on spaced apart tracks 47. The cart 48 is provided with spaced apart wheels 49 mounted on axle 50 which in turn is mounted on a cart frame 51. Each of the carts 48 is adapted to receive a load of lumber 52 having a plurality of boards 53 in the load. When a cart is filled with a predetermined number of boards 53, all that is required is that the operator move the cart off of the track and unload the lumber and take it to other apparatus to treat the lumber. This expedient therefore is much simpler than the prior art teaches since the lumber in each one of the carts is of a similar grade and size.

Having described the detailed structure of the present invention the lumber conveyor functions in the following manner:

The operator actuates the power structure which drives the chains 6 in the direction of the arrow 58 as shown in FIGURE 1. The operator then grades and sorts the lumber in front of a grading table and mounts the lumber in the carrier arms 7. The carrier arms 7 are composed of an upper horizontal portion 60 joined to a vertical portion 61 which in turn is joined to another lower horizontal section 62. The lumber, such as that shown at 53 in FIGURE 2, rests upon a lower horizontal portion 62.

As the lumber 53 is conveyed down the conveyor 1, it will be designated for a particular bin which has the same type of grade and size as the lumber therein. When the conveyor 1 carries the lumber 53 to above the particular bin to which it is designated, the rake mechanisms 34 are actuated by allowing air or other fluid to flow into the cylinder 36 and the arms 42 will rake the lumber 53 off into the bin.

It should be pointed out that the rake mechanism 34 can be actuated in any number of conventional ways. These conventional ways include a conventional memory system which automatically ejects the lumber 53 into the particular bin or by a limit switch mounted on the frame to actuate the rake mechanism 34 when the lumber passes adjacent the limit switch. In addition, the operator can actuate the rake mechanism 34 by a manually operated switch.

If for some reason or another, the rake mechanism 34 does not actuate the arms 42 and the lumber 53 is not ejected into the particular bin that it is designated to be received in, the lumber will be carried onto the end portion of the conveyor. As the arm 7 approaches the end of the conveyor, the lumber 53 will be deposited upon the receiving arm 16 as shown at 54 in FIGURE 2. As the next arm structure 7 approaches the lumber 54, the vertical portion of 61 thereof will push the lumber 54 ahead of it and up around the arced slide portion 19 and up onto the top of the conveyor portion, as shown at 56 in FIGURE 2. In this manner the lumber will be conveyed back to the grading station so that it can be rerun through the lumber conveyor.

In the event that a scrap portion of lumber reaches the end of the conveyor, the operator need only actuate a solenoid valve which actuates the hydraulic motor 26. When the hydraulic motor 26 is actuated, the movable arm 18 will pivot around pivot pin 25 and the lumber 54 will be ejected down the arm 18 onto the chute section 32. Such a piece of lumber is shown at 57 in FIGURE 2.

In addition to the horizontal portion 61 of the carrier hooks 7, the booster mechanism 15 which is attached to the wheels 13 and 14 will aid the mechanism 7 in pushing the lumber 55 up around the wheel or sprocket 8 so that the lumber can be reclaimed.

It should be pointed out that a conventional counter mechanism can be associated with each bin so that when one of the bins or carts receives a predetermined number of boards 53, the mechanism 34 will be deactivated by the counter mechanism and the lumber designated for that bin will be reclaimed around the end thereof while the cart 48 is being unloaded.

While specific details of the preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:
1. A lumber sorter and conveyor, comprising:
an elongated frame providing a plurality of bins adapted to receive graded lumber;
a pair of spaced apart endless chain members mounted on upper and lower track members;
carrier bars connected to said chain members adapted to carry lumber;
rake means adapted to eject the lumber into a respective bin;
means to reclaim lumber in the event said rake means fails to eject the lumber in one of said bins;
said reclaiming means including:
    a receiving arm adapted to receive said lumber to be reclaimed,
    an arcuate slide portion to aid in guiding said lumber back onto said endless chain in said upper track,
    means to move said lumber to be reclaimed around said arcuate slide portion,
    and booster means to aid in pushing said lumber around chain.

2. The subject matter of claim 1 together with movable means associated with the receiving arm to eject waste lumber which includes an angular displaced slide member.

3. The subject matter of claim 1 wherein said carrier bars connected to said chain members includes an upper horizontal portion connected to a vertical portion connected to a lower horizontal portion to present a generally U-shaped member adapted to carry said lumber along said conveyor.

References Cited by the Examiner
UNITED STATES PATENTS

| | | | |
|---|---|---|---|
| 1,363,533 | 12/1920 | Roe | 198—137 X |
| 1,886,896 | 11/1932 | Nelson | 209—75 |
| 3,116,835 | 1/1964 | Brandon | 209—90 |

FOREIGN PATENTS

| | | |
|---|---|---|
| 861,205 | 2/1961 | Great Britain. |

ROBERT B. REEVES, *Primary Examiner.*